United States Patent [19]
Daughtry

[11] Patent Number: 6,164,832
[45] Date of Patent: Dec. 26, 2000

[54] BALL BEARING ASSEMBLY

[75] Inventor: Mervil Edward Daughtry, Irmo, S.C.

[73] Assignee: E. I. du Pont de Nemours and Company, Wilmington, Del.

[21] Appl. No.: 09/304,547

[22] Filed: May 4, 1999

Related U.S. Application Data

[60] Provisional application No. 60/085,799, May 18, 1998.

[51] Int. Cl.[7] .............................. F16C 33/66; F16C 33/76
[52] U.S. Cl. ......................... 384/473; 384/462; 384/477; 384/488
[58] Field of Search ..................................... 384/462, 464, 384/469, 473, 477, 488, 489; 29/898.1, 898.11

[56] References Cited

U.S. PATENT DOCUMENTS

| | | | |
|---|---|---|---|
| 1,722,488 | 7/1929 | Bott et al. ................ | 384/488 |
| 2,114,954 | 4/1938 | Brodin .................... | 384/488 |
| 2,926,052 | 2/1960 | Cain, Jr. ................. | 384/473 |
| 3,194,759 | 7/1965 | Devine et al. ............. | 252/12 |
| 3,424,273 | 1/1969 | Carlson et al. ............ | 384/473 X |
| 4,082,381 | 4/1978 | Simmons et al. . | |
| 4,286,829 | 9/1981 | Heemskerk . | |
| 4,357,749 | 11/1982 | Lira ....................... | 29/724 |
| 4,501,534 | 2/1985 | Hargis .................... | 417/572 |
| 4,582,169 | 4/1986 | Alvis et al. .............. | 184/5.1 |
| 4,633,553 | 1/1987 | Chronis et al. ........... | 29/116 |
| 4,722,616 | 2/1988 | Lederman ................ | 384/482 |
| 4,856,916 | 8/1989 | Ito et al. ................. | 384/477 |
| 4,940,341 | 7/1990 | Schuetz et al. ........... | 384/465 |
| 4,941,757 | 7/1990 | Hall ....................... | 384/473 |
| 5,102,240 | 4/1992 | Oehy et al. .............. | 384/472 |
| 5,150,974 | 9/1992 | Tamada et al. ........... | 384/463 |
| 5,259,671 | 11/1993 | Lowe et al. .............. | 366/83 |
| 5,484,212 | 1/1996 | Guaraldi et al. .......... | 384/462 |
| 5,498,086 | 3/1996 | Ou ......................... | 384/491 |
| 5,671,825 | 9/1997 | Wong et al. .............. | 184/6.4 |
| 5,697,709 | 12/1997 | Mori et al. ............... | 384/297 |
| 5,803,616 | 9/1998 | Persson et al. ........... | 384/473 |

FOREIGN PATENT DOCUMENTS

| | | |
|---|---|---|
| 2.091.608 | 1/1972 | France . |
| 3540252 | 6/1986 | Germany . |
| 4336075 | 4/1995 | Germany . |
| 58-160627 | 9/1983 | Japan . |
| 59-013124 | 1/1984 | Japan . |
| 08338426 | 12/1996 | Japan . |

OTHER PUBLICATIONS

Theodore Baumeister, Editor, Principal Standard Bearing Types, *Mechanical Engineers' Handbook*, (8)143–145, 1958.
NTN Toyo Bearing Co. Ltd. Catalogue No. 2010, *NTN Ball and Roller Bearings*, (A)103–107, (B)10, B(26), 1981.
NTN Bearing Corp of America. Catalogue #A1000–VI, *NTN Ball and Roller Bearings*, 16–18, 1995.
Cooper Bearing Company Product Reference Guide, Section 6.5—Grease Lubrication, 6–4–6–7, 1994.

*Primary Examiner*—Thomas R. Hannon

[57] ABSTRACT

A bearing assembly that avoids excess grease yet provides additional oil as needed from one or more reservoirs in one or more shields mounted on the assembly.

7 Claims, 4 Drawing Sheets

BALL BEARING ASSEMBLY

CROSS-REFERENCE TO RELATED APPLICATIONS

This application claims benefit of priority from Provisional Application No. 60/085,799, filed May 18, 1998.

FIELD OF THE INVENTION

This invention relates to improvements in the greasing of ball bearing assemblies, and more particularly to novel such assemblies and to methods of preparing and of maintaining such assemblies.

BACKGROUND OF THE INVENTION

Deep groove ball bearings comprise an inner ring with a ball groove (inner raceway), an outer ring with a ball groove (outer raceway) and a plurality of balls in the grooves that are circumferentially separated by a cage that loosely engages the balls. Grease is commonly employed to lubricate the balls and raceways to lower friction and prevent direct metal to metal contact. The grease typically consists of a metal soap or other thickening agent that holds an oil or synthetic fluid and some additives to improve the lubricating or other properties. Frequently, a shield is attached to the outer ring to help contain the grease and exclude dirt from the raceways.

High speed ball bearing operation takes place when the dn number for the ball bearing exceeds about 150,000 mm/min where dn=shaft dia in mm×rpm. For a 25 mm shaft, a speed greater than 6,000 rpm would be considered high speed operation. It is known that the presence of excess grease in the raceway of the bearing causes heating of the bearing and of the grease, and may ultimately lead to degradation of the grease and a subsequent reduction of bearing life, as discussed, for example, by Simmons et al. in U.S. Pat. No. 4,082,381. Shortening of the bearing life is a significant problem when the bearing must be changed frequently to avoid or respond to unscheduled outages. In some applications, the heat produced in the bearing causes heating of elements in a machine that may be detrimental to a process or a product utilizing such machine. Some bearing manufacturers have suggested that the way to handle the high speed is to use a "hybrid ceramic" bearing having ceramic balls and metal rings, but this is more expensive and does not eliminate heating of the grease. Another solution has been to use an oil mist lubrication system, but this is more expensive to provide and maintain, and the mist is sometimes difficult to contain and can produce environmental problems for people and products.

Bearing and grease manufacturers have recognized the problems this excess grease causes for high speed operation and at least one grease manufacturer has recommended special run-in procedures to work the grease out of the ball path for high speed operation. These procedures are time-consuming and cumbersome to practice and expensive to implement, especially when large numbers of bearings are involved.

An object of my invention is to provide a better solution to these problems. My invention also provides advantages for bearing assemblies in other than high speed operations, namely improved longevity.

Ball bearings have been operated in the past at speeds of 12,000 rpm by using a conventional bearing provided by NTN Bearing Corporation of America and removing one of the shields to permit air circulation through the bearing to lower the operating temperature. I have found that this has kept the peak machine element temperature adjacent the bearing below 110° F. (43° C.). This has worked, but I have found that this has allowed grease to be slung out of the bearing so the bearing life has been only about 6 months. In another test, the grease was cleaned out of a conventional bearing and only a drop of grease was placed in the raceway, only a bead of grease was placed on the inner ring land, and the outer ring shields were reinstalled which pushed some grease up against the bearing cage. This resulted in a peak machine element temperature at startup slightly greater than 110° F. (43° C.), and a temperature slightly below 110° F. (43° C.) after 24 hours. Such an initial peak temperature is undesirably high.

Conventional bearings are designed for inner ring rotation and bearing shields are therefore mounted on the normally stationary outer ring. The shields help exclude dirt from the bearing and contain the grease that is normally packed in the bearing to fill 30–50% of the free space within the bearing between the shields on each side of the bearing. In some cases it has been considered desirable to mount the conventional bearing for outer ring rotation. The shield mounted on the outer ring would then rotate with the outer ring of the bearing. I believe this is undesirable for high speed operation since it is my opinion that the rotating shields further agitate and heat the grease, and facilitate leakage of the grease past the shields. I believe that anything more than a thin film of grease causes undesirable heating, but I also believe that providing only a thin film and nothing more does not provide a sufficient reserve of grease for long term bearing operation. The oils in the grease are eventually wicked to the bearing which eventually throws the oil off or causes vaporization, oxidation, and loss of the oils so only the base thickener in the grease remains.

Hall, U.S. Pat. No. 4,941,757, disclosed a flexible, arcuate grease reservoir member 32 of generally C-shaped configuration, attached to the stationary outer ring of a bearing and holding a reservoir of grease, with spaced ends 34 and 36, a generally cylindrical outer surface 38 and a generally cylindrical inner surface 42 (col 2, lines 55 et seq.). The surfaces 38 and 42 of Hall's C-shaped member 32 extended about 240° to 260° about their axis so the spaced ends 34 and 36 could be flexed during mounting of the reservoir member on the bearing and removal from the bearing (col 3, lines 14 et seq.). In other words, Hall's reservoir member 32 did not extend all the way round the bearing. Hall's reservoir 10 replaced one of the conventional shields (col 2, lines 52–54). Hall's reservoir 10 was for use with a conventional bearing (col 2, lines 30–32), i.e., one packed with grease (col 1, lines 7 et seq.). His grease reservoir was designed to be easily attached and removed from the bearing without removing the bearing from its mounting or even having to remove the shaft passing through the bearing (col 1, lines 30–35 and 48–60). Such a packed bearing would cause the grease to heat if it were to be used in high speed operations, and Hall's replacement of a shield by his C-shaped reservoir member 32 would permit grease to be ejected by centrifugal forces during high speed operation.

SUMMARY OF THE INVENTION

One aspect of the present invention is an improved ball bearing assembly having an inner ring and an outer ring for use in an installation in which one ring is stationary, and having a shield, and the stationary ring having a raceway for ball bearings, a land, a shield support surface and a shoulder extending between the land and the support surface, the shoulder having a predetermined height, the improvement wherein the shield has an internal reservoir and a mounting wall to mount the shield on the stationary ring, and the mounting wall has a thickness that is less than the height of the shoulder.

Preferably shoulders are provided on both sides of the stationary ring, and a shield having an internal reservoir is mounted on each side of the stationary ring.

Another aspect is a method of preparing a greased ball bearing assembly, comprising: obtaining an open shieldless bearing assembly having moving elements and being free of grease, the assembly having a first ring that is adapted to remain stationary in use, said first ring having a mounting surface and shoulder adapted to accept a shield, said shoulder terminating at a ring land that communicates with a ring raceway; treating the shieldless bearing assembly so said ring land and said raceway are coated with a thin film of grease or oil; providing at least one shield with an annular grease reservoir having a mounting wall and opposed wall, and packing the shield with grease; shaping the resulting grease packed within the shield so the packed grease has a bulge that extends beyond the mounting wall; and mounting the grease-packed shield on the stationary ring until the mounting wall contacts the shoulder and so that grease that extends beyond the mounting wall contacts the thin film on the ring land but avoids direct contact with any bearing elements that are adapted to move.

Thus, in operation in my bearing assembly, the bearing raceway is essentially "greaseless", i.e., has only a thin film of grease or oil, and one or more special shields with grease cavities are mounted on the inner ring for outer ring rotation, or are mounted on the outer ring for inner ring rotation. The shield(s) hold a reservoir of grease that extends past the mounting wall of the shield to intersect a shoulder on the appropriate ring during assembly to bring the grease in the reservoir into contact with the thin film of grease or oil on the land of the appropriate ring to provide a pathway from the grease in the reservoir to the raceway. It is important that the reservoir grease should not directly contact the moving elements within the bearing. Additional discrete paths of grease, that may be thicker than such thin film, but not such as would interfere with the ball cage, may be applied to the land to improve the reliability of the pathway.

DETAILED DESCRIPTION

Figure 1:
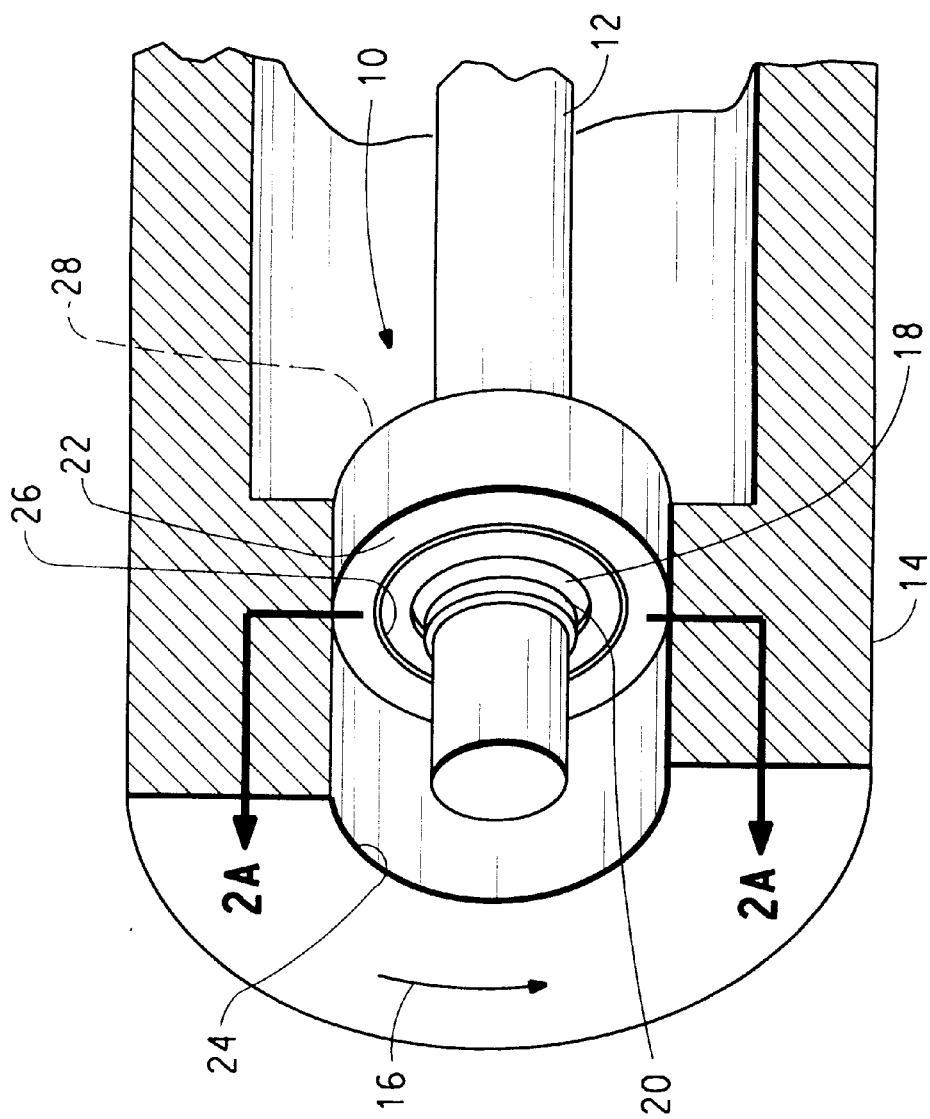
FIG. 1 is an isometric schematic view of a bearing mounted on a stationary shaft and supporting a roll for rotation with the roll partially shown in section.

FIG. 1 shows a ball bearing assembly 10 mounted on a stationary shaft 12 and supporting a roll 14 for rotation in the direction of arrow 16. The bearing assembly 10 has a stationary inner ring 18 that is snugly fitted on support surface 20 of shaft 12, and a rotatable outer ring 22 that is snugly fitted in bore 24 of roll 14. The bearing has a shield 26 mounted on the inner ring 18 and radially spaced from outer ring 22. The shield keeps dirt out of the bearing, contains the grease in the bearing, and permits free rotation of the outer ring 22. Another similar shield 28 would be present on the opposite side of the bearing not seen in this view. The shields may typically be fabricated of aluminum or formed from stamped steel or molded from a polymeric material. The roll 14 would also be supported in a similar manner by another bearing on shaft 12 at another location not shown.

Figures 2A, 2B, 2C:
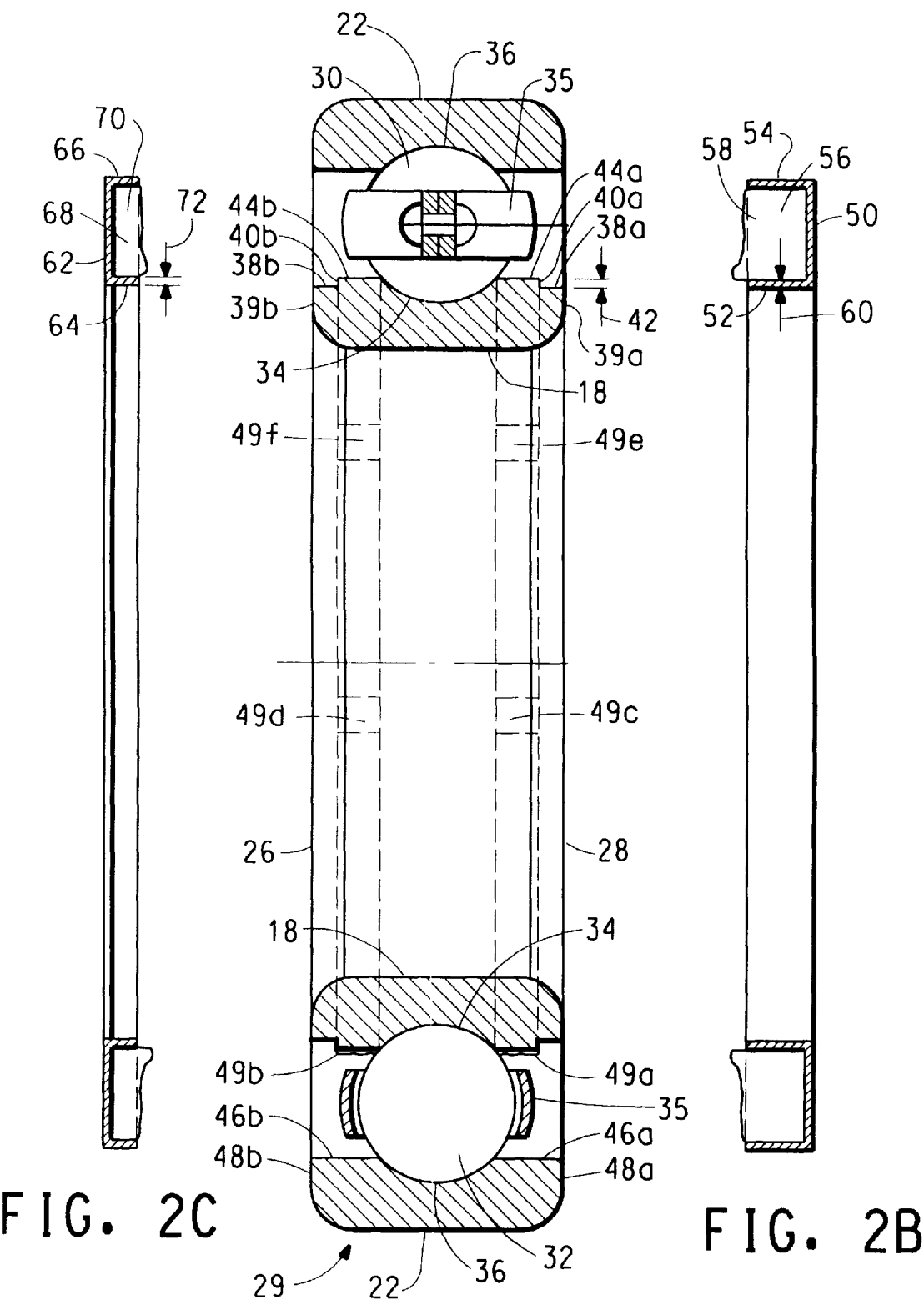
FIG. 2A is a section view 2A—2A of the outer ring rotation bearing of FIG. 1 taken through the center of the bearing bore with the ball cage sectioned through the ball at the bottom of the view and through the portion between balls at the top of the view.
FIG. 2B is a similar section view taken through the center of a first shield bore for the bearing of FIG. 1, the first shield having a large grease reservoir.
FIG. 2C is a similar section view taken through the center of a second shield bore for the bearing of FIG. 1, the second shield having a small grease reservoir.

FIGS. 2A, 2B and 2C are shown on the same sheet of drawings. FIG. 2A shows section view 2A—2A from FIG. 1 through the ball bearing assembly 10 showing a shieldless bearing assembly 29 with the stationary inner ring 18 adapted for receiving shields. Placed between the inner ring 18 and rotatable outer ring 22 are a plurality of balls, such as balls 30 and 32. The balls 30 and 32 contact the inner ring 18 in a grooved inner raceway 34, and contact the outer ring 22 in a grooved outer raceway 36. The balls are spaced apart around a circumference of the bearing assembly 10 by a cage 35. The stationary inner ring 18 has shield mounting surfaces 38a on one side and 38b on the opposite side for mounting a first shield 28 and a second shield 26, shown respectively in FIGS. 2B and 2C. The surface 38a begins at the face 39a of the inner ring 18, and the surface 38b begins at the face 39b of the inner ring. The mounting surfaces 38a and 38b terminate in shoulders 40a for surface 38a and 40b for surface 38b. Each shoulder has a predetermined height (shown as 42) that terminates at lands 44a and 44b of the inner ring 18. The lands 44a and 44b extend to the inner raceway 34 and are present on both sides of the raceway 34. The outer ring 22 has lands 46a and 46b on both sides of outer raceway 36 and extending from the outer raceway 36 to faces 48a and 48b of the outer ring 22.

The shieldless bearing assembly 29 is essentially "greaseless" in the sense that it is only required that the inner ring lands 44a and 44b and inner ring raceway 34 are coated with a thin film of grease or oil (not shown). The entire shieldless bearing assembly 29 (further including the balls, cage, and outer ring) may be coated with such a thin film to simplify the coating process.

In some cases, it may be desired to apply one or several additional discrete paths of grease on the inner ring land 44a (extending from the shoulder 40a which would be in contact with the grease in the reservoir when the grease packed shield 28 is mounted on mounting surface 38a) to the inner ring raceway 34, as illustrated at 49a, 49c and 49e. Similarly, additional grease paths from shield 26 could be applied on land 44b as well, such as illustrated at 49b, 49d and 49f. Such additional discrete paths of grease could be thicker than the thin film of grease or oil on land 44a (and 44b), but should not be so thick as to directly contact the moving elements within the bearing. These would provide more substantial paths for the oil in the grease to get to the raceway from the shield reservoir(s).

FIG. 2B shows a shield 28 that has a "U"-shaped cross-section with an end wall 50, a mounting wall 52 and an opposed (outer) wall 54 which forms an annular reservoir 56. The reservoir 56 contains a grease 58 which is packed into the shield. The grease should be adjacent mounting wall 52 and should extend beyond the mounting wall 52 but be carefully shaped so it bulges outwards as it extends beyond mounting wall 52. The bulge may extend about 5%–45% of the distance across the reservoir 56 to outer wall 54. It is important that thickness 60 of the mounting wall 52 be less than height 42 of shoulder 40a on inner ring 18. This coupled with the extension of the grease beyond mounting wall 52 is to insure that the grease will extend beyond the shoulder 40a to contact inner land 44a when the shield 28 is assembled with inner ring 18.

FIG. 2C shows shield 26 that has a somewhat similar "U"-shaped cross-section with an end wall 62, a mounting wall 64 and an opposed (outer) wall 66 which forms an annular reservoir 68. The reservoir 68 contains a grease 70 which is packed into the shield. The grease should be adjacent mounting wall 64 and should extend beyond the mounting wall 64 and be carefully shaped so it has a bulge that extends beyond mounting wall 64. The bulge may extend about 5%–45% of the distance across reservoir 68 to outer wall 66. It is important that thickness 72 of the mounting wall 64 be less than the height 42 of shoulder 40b on inner ring 18. This coupled with the extension of the grease beyond mounting wall 64 is to insure that the grease will extend beyond the shoulder 40b to contact inner land 44b when the shield 26 is assembled with inner ring 18.

Figure 3:
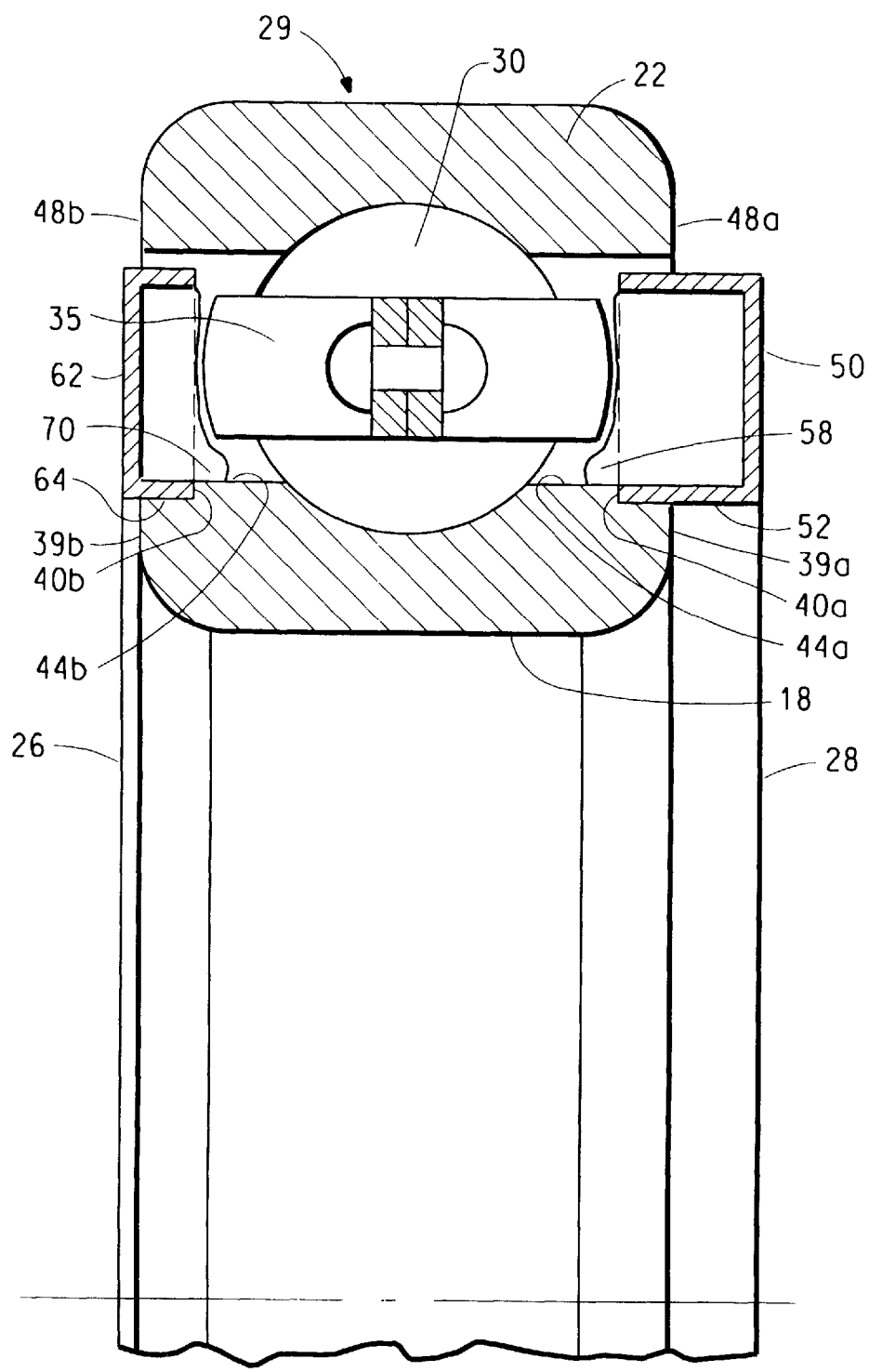
FIG. 3 is an enlarged section view similar to the top of FIG. 2A wherein the first and second shields of FIGS. 2B and 2C, respectively, are mounted on the inner ring to accommodate outer ring rotation of the bearing.

FIG. 3 shows the shields 26 and 28 packed with such bulges of grease assembled with the bearing assembly 29 by attachment to the inner ring 18. The grease 70 which extended beyond mounting wall 64 of shield 26 now has been displaced by shoulder 40b so some of the grease is in contact with inner land 44b. Grease 70 should not, however, appreciably contact cage 35. The grease 58 which extended beyond mounting wall 52 of shield 28 now has been displaced by shoulder 40a so some of the grease 58 is in contact with inner land 44a. Grease 58 should not appreciably contact cage 35. Shield 26 has a small reservoir and the end wall 62 of shield 26 is approximately flush with end faces 39b of the inner ring 18 and 48b of the outer ring 22. This illustrates the case of a reservoir shield where the area surrounding the bearing may interfere with a protruding shield. Shield 28 has a large reservoir and the end wall 50 of shield 28 protrudes beyond end faces 39a of the inner ring 18 and 48a of the outer ring 22. This illustrates the case of a reservoir shield where the area surrounding the bearing will accommodate a protruding shield that can hold a large reservoir of grease that may provide enough oil in the grease to permit operation of the bearing for years instead of months.

A suitable procedure for preparing a bearing for outer ring rotation and a stationary inner ring may be as follows:

a shieldless bearing assembly having an inner ring with mounting surfaces and shoulders adapted to receive shields is obtained and is first cleaned of all grease. The shieldless bearing assembly is then immersed in a mixture of a solvent and a grease, e.g., in proportions of 50%–90% solvent to 50%–10% grease. Preferably, the proportion of solvent to grease is 70%–80% solvent to 30%–20% grease. Suitable greases are made by Kluber Lubrication North America, Inc. of Londonderry, NH, under the trade names of Isoflex Super LDS-18, Topas NB-52, Topas NCA 52, Asonic HQ72-102, or the like. Suitable solvents are hydrochlorofluorocarbon (HCFC) liquids, such as 1,1-dichloro-1-fluoroethane. The bearing is removed from the mixture and the solvent is allowed to evaporate leaving behind a thin film of grease throughout the shieldless bearing assembly. This is to provide enough grease in the assembly initially to lubricate the bearing and prevent metal to metal friction and to resist corrosion. Alternatively, a thin film of oil may be applied, e.g., by aerosol-spraying or by dipping the bearing in a bath of oil.

the small reservoir shield and large reservoir shield are packed with additional grease that was used for the raceway coating and the grease is shaped into a bulge adjacent the mounting wall of each reservoir as described above. It is important that sufficient grease be packed into the two reservoirs to fill the reservoirs and extend in a bulge beyond the mounting wall of each reservoir that is to be assembled with the inner ring. It is important that the shoulder in the inner ring that is designed to receive the bearing shield have a height that is greater than the mounting wall thickness of the shield, to thereby displace the bulge of grease extending beyond the mounting wall.

one shield is mounted on each mounting surface on the inner ring. For each shield, the grease extending beyond the mounting wall is displaced by the corner of the shoulder and is forced along the land of the inner ring for a short distance. This insures the grease in the reservoir makes contact with the thin film on the land of the inner ring so there is a path of grease soap or thickening agent from the reservoirs to the land of the inner ring, and then a path continues to the inner ring raceway. This path of soap or thickening agent provides a pathway for the oil in the grease to move from the reservoir to the raceway to lubricate the balls. In this way, the bearing can receive lubrication over a long period (e.g., for years) and yet do so without placing noticeable grease in the raceway or in the way of the circulating bearing cage which would create undesirable heating of the bearing, especially initially, when starting up.

Figure 4:
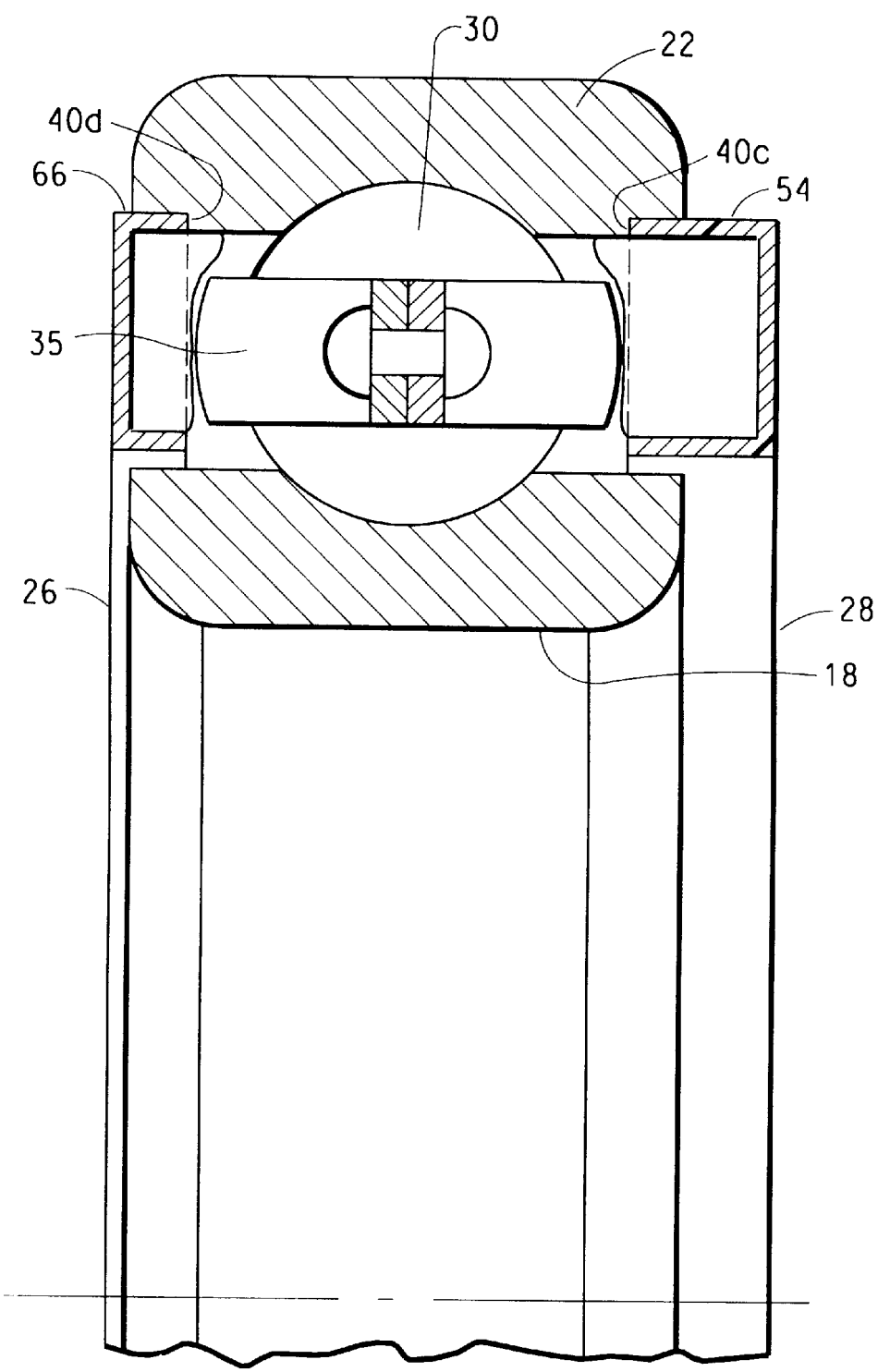
FIG. 4 is an enlarged section view similar to FIG. 3, but showing an application of the invention where the first and second shields are mounted on the outer ring to accommodate inner ring rotation of the bearing.

FIG. 4 shows how the invention is applied to a bearing adapted for inner ring rotation. In this case, the outer ring 22 would be stationary and would have a shoulder 40c adapted to accept shield 28, and a shoulder 40d adapted to accept shield 26. When attaching shield 28, wall 54 becomes the mounting wall, and when attaching shield 26, wall 66 becomes the mounting wall. The bulge shapes of the grease would be adjacent the mounting walls 54 and 66 to be displaced by shoulders 40c and 40d, respectively.

This greased bearing assembly is easy to assemble and can provide high speed performance without the need for prior costly run-in procedures, and can provide a long period of operation of the bearing without requiring maintenance or regreasing. I believe that if the bearing is of a size for a one inch (2.5 cm) shaft, the maximum bearing operating temperature using the greasing system of the invention would be less than about 95° F. (35° C.) when started up and operated at a high speed of 12,000 rpm.

These bearings make it practical to operate rolls at high speed thereby increasing machine speed and product capacity with little investment. The price of the new bearings is expected to be only slightly more per bearing than conventional bearings, and should not require a tedious run-in period, and should have a long operating life even with the limited amount of grease in the bearing. The new bearings are expected to increase uptime and decrease maintenance cost.

These bearings would be very useful in any NEMA frame bearing application where the bearings are lubricated for life, even when not used for high speed applications because the bearings are expected to have a much longer life than conventional bearings.

What is claimed is:

1. A ball bearing assembly having an inner ring and an outer ring for use in installation in which one ring is stationary, and having a shield, and the stationary ring having a raceway for ball bearings, a land, a shield support surface and a shoulder extending between the land and the support surface, the shoulder having a predetermined height, wherein the shield has an internal reservoir of grease and a mounting wall to mount the shield on the stationary ring, and the mounting wall has a thickness that is less than the height of the shoulder, and wherein the grease in the reservoir extends past the mounting wall of the shield to intersect the shoulder on the stationary ring during assembly to bring the grease in the reservoir into contact with a thin film of grease on the stationary ring land to provide a pathway from the grease in the reservoir to the raceway.

2. The bearing assembly of claim 1, wherein the stationary ring is the inner ring.

3. The bearing assembly of claim 1, wherein shoulders and shields are provided on both sides of the stationary ring, and the shields each have an internal reservoir packed with grease mounted on each side of the stationary ring.

4. The bearing assembly of claim 1, wherein the grease that extends beyond the mounting wall avoids direct contact with any element of the bearing assembly that is adapted to move.

5. The bearing assembly of claim 1, further comprising a discrete path of grease on the stationary ring land to the stationary ring raceway.

6. A ball bearing assembly having an inner ring and an outer ring for use in an installation in which one ring is stationary, and having a shield, and the stationary ring having a raceway for ball bearings, a land, a shield support surface and a shoulder extending between the land and the support surface, the shoulder having a predetermined height, wherein the bearing assembly is cleaned of all grease except for a thin film throughout including a thin film on the stationary ring raceway and the stationary ring land, the shield has an internal reservoir and a mounting wall to mount the shield on the stationary ring, and the mounting wall has a thickness that is less than the height of the shoulder, and the shield is packed with grease that extends beyond the mounting wall of the shield to intersect a shoulder on the stationary ring during assembly to bring the grease in the reservoir into contact with the thin film of grease on the land of the stationary ring to provide a pathway from the grease in the reservoir to the raceway, and further wherein the reservoir grease does not directly contact the moving elements within the bearing assembly.

7. A method of preparing a greased ball bearing assembly, comprising:

obtaining an open shieldless bearing assembly having moving elements and being free of grease, the assembly having a first ring that is adapted to remain stationary in use, said first ring having a mounting surface and shoulder adapted to accept a shield, said shoulder terminating at a ring land that communicates with a ring raceway;

treating the shieldless bearing assembly so said ring land and said raceway are coated with a thin film of grease or oil;

providing at least one shield with an annular grease reservoir having a mounting wall and opposed wall, and packing the shield with grease;

shaping the resulting grease packed within the shield so the packed grease has a bulge shape that extends beyond the mounting wall;

and mounting the grease-packed shield on the stationary ring until the mounting wall contacts the shoulder and so that grease that extends beyond the mounting wall contacts the thin film on the ring land but avoids direct contact with any bearing elements that are adapted to move.

* * * * *